Oct. 27, 1970          G. F. PICKENS ET AL          3,536,388
    MOTION-PICTURE PROJECTOR GATE SYSTEM FOR ACCOMMODATING
                     MULTIPLE FILM FORMATS
Filed Dec. 26, 1967                           2 Sheets-Sheet 1

GERALD F. PICKENS
HENRY C. HOPF
THOMAS G. KIRN
            INVENTORS

BY Gary D. Fields
   Robert W. Hampton
            ATTORNEYS

Oct. 27, 1970

G. F. PICKENS ET AL 3,536,388

MOTION-PICTURE PROJECTOR GATE SYSTEM FOR ACCOMMODATING
MULTIPLE FILM FORMATS

Filed Dec. 26, 1967

GERALD F. PICKENS
HENRY C. HOPF
THOMAS G. KIRN
INVENTOR.

BY Gary D. Fields
Robert W. Hampton

ATTORNEYS

United States Patent Office 3,536,388
Patented Oct. 27, 1970

3,536,388
MOTION-PICTURE PROJECTOR GATE SYSTEM FOR ACCOMMODATING MULTIPLE FILM FORMATS
Gerald F. Pickens, Henry C. Hopf, and Thomas G. Kirn, Rochester, N.Y., assignors to Eastman Kodak Company, Rochester, N.Y., a corporation of New Jersey
Filed Dec. 26, 1967, Ser. No. 693,379
Int. Cl. G03b 41/00
U.S. Cl. 352—79                3 Claims

ABSTRACT OF THE DISCLOSURE

A film gate having apertures corresponding in size to the film frame size of super 8 and regular 8 format is movable longitudinally between selective positions and is movable laterally for selectively positioning the perforations of either format in alignment with the film-feed mechanism. Both of these movements may be accomplished by a single control lever. The film-feed mechanism has a stroke and a claw spacing that is suitable for either regular 8 or super 8 projection without adjustment.

CROSS-REFERENCES TO RELATED APPLICATIONS

Reference is made to commonly assigned copending U.S. patent application Ser. No. 567,724, entitled, "Motion Picture Projector," filed July 25, 1966, in the name of Robert J. Roman, now abandoned; U.S. patent application Ser. No. 654,004, entitled, "Motion-Picture Projector," filed on July 17, 1967, in the name of John J. Bundschun et al., now Pat. No. 3,402,006; and U.S. patent application Ser. No. 693,486, entitled "Motion-Picture Projector Gate System for Accommodating Multiple Film Formats," filed on even date herewith in the name of Gerald F. Pickens et al.

BACKGROUND OF THE INVENTION

This invention relates to an improved motion-picture projector adapted to selectively project different types of motion picture film which differs in frame size and perforation arrangement. More particularly, the invention relates to a projector which may be utilized to project 8 mm. film of either the regular 8 or super 8 film format.

DESCRIPTION OF THE PRIOR ART

In order to improve the picture quality of 8 mm. film, a new frame format known as super 8 is being utilized which increases the image area. This increase in picture area is accomplished by reducing the width of the perforations which are now placed closer to the edge of the film and opposite the center of each frame. Since the overall width of these two film formats is the same, they may be guided through the same film guide past a projection aperture. However, the difference in the lateral location of the line of perforations and the relative spacing makes it difficult to project both film formats from the same projector. The prior art has sought to overcome this problem by providing either separate claw machanism for each format or adjustable claw mechanism whose stroke may be varied to accommodate the format being projected. Also, some devices provide shiftable side guides to adjust the lateral position of the film. Since the size of the image frame changes, means also must be provided to change the size of the gate aperture. This has been accomplished in the prior art by a movable member having two openings corresponding to the film formats which may be selectively aligned with the optical system of the projection. In some cases, a mechanism is provided which will change the aperture size and switch claw mechanisms or adjust a single clam mechanism in one operation to correspond to the film format being projected. Other devices provide a mechanism which simultaneously change the aperture size and shift the film side guides. Still other devices provide multiple sprockets which must be shifted to accommodate different formats. However, such structure tends to be quite complicated, thereby increasing the overall cost of a projector which is capable of accommodating both the regular 8 and super 8 formats. Also, the lateral shifting of the film required by some mechanisms may damage the film.

SUMMARY OF THE INVENTION

The present invention overcomes these difficulties by providing a pull-down mechanism with a film engaging member such as a claw having a cross section smaller than the perforations of films having different perforations and format dimensions and by using a single compromise claw movement that will work with different film format. The difference in the lateral locations of the perforations relative to the edge of the film of each format is compensated for by laterally shifting a film gate with respect to the axis of the pull-down mechanism to a position where the claw can engage the perforations of the desired format. The difference in frame size is compensated for by longitudinally shifting the film guide relative to the axis of the pull-down mechanism to selectively position openings therein to correspond to the desired format. The single lever is attached to the film gate for moving it in cooperation with a cam means, so that the film gate is shifted laterally and also moved vertically to position the openings to change the aperture size, both movements being accomplished simultaneously.

Additional novel features of this invention will become apparent from the description which follows, taken in conjunction with the accompanying drawings.

DESCRIPTION OF THE PREFERRED EMBODIMENT

Figure 1:
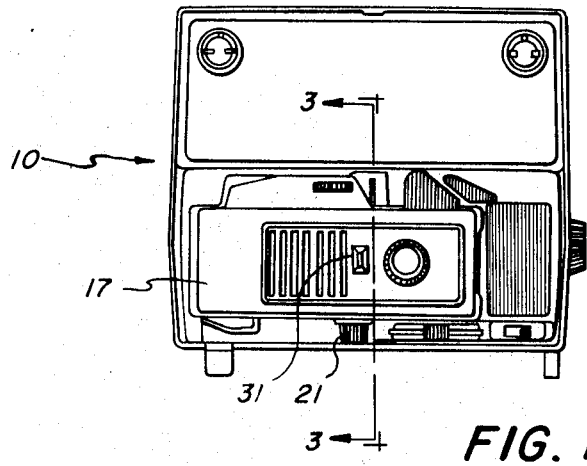
FIG. 1 is a side elevation of a movie projector, on a reduced scale, utilizing the gate system of this invention.
Figure 2:
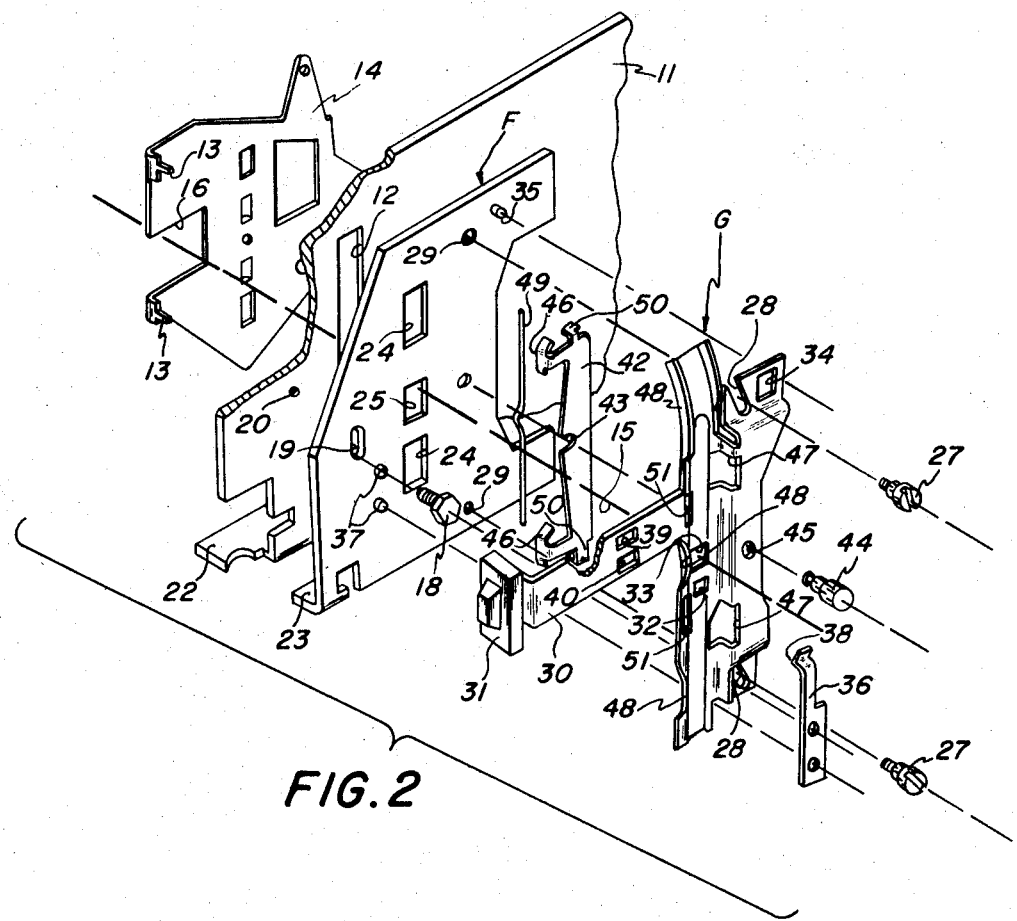
FIG. 2 is an exploded view of the parts of the gate system of this invention.
Figure 3:
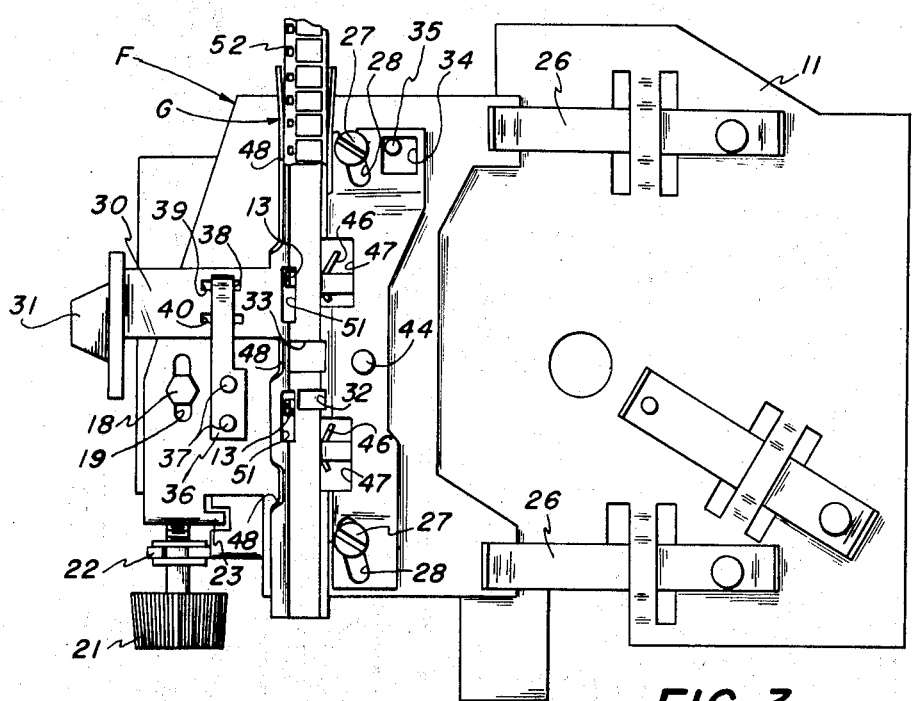
FIG. 3 is a vertical section, on an enlarged scale, taken along line 3—3 of FIG. 1, showing the gate system in the super 8 film format positions.
Figure 4:
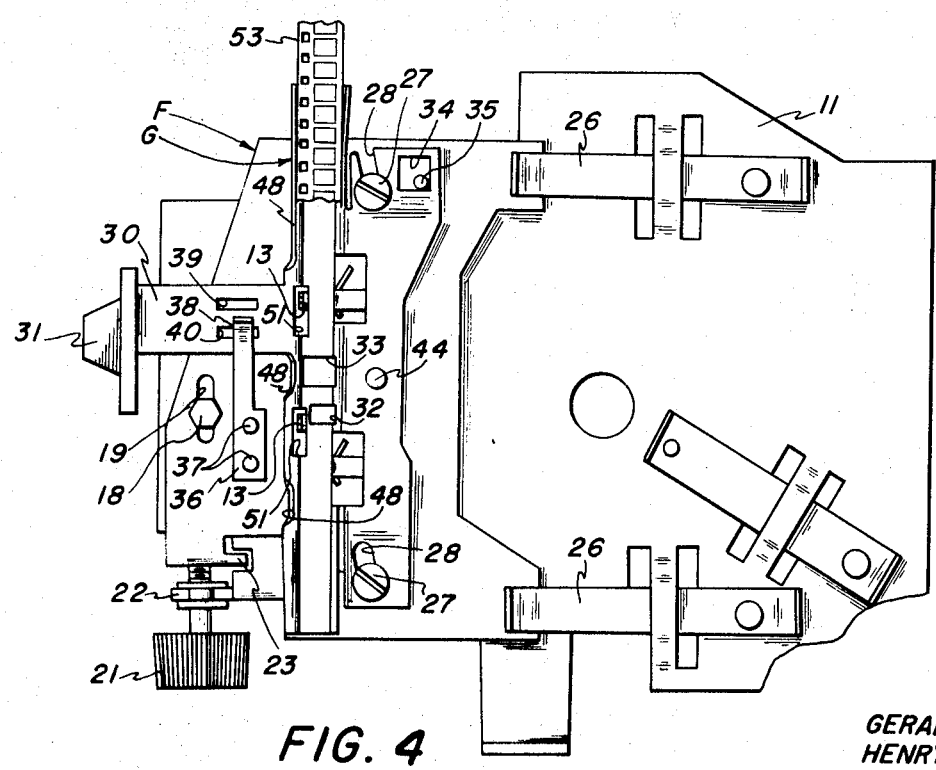
FIG. 4 is a vertical section, similar to FIG. 3, but showing the gate system in the regular 8 film format position.

In accordance with this invention a projector 10 is provided, showing FIG. 1 provided with gate system which may be utilized for projecting either regular 8 or super 8 film. As best seen in FIGS. 2–4, the gate system includes a support 11 having a vertical slot through which a pair of spaced claws or teeth 13 of the film advance or pull-down mechanism 14 may extend. Conveniently, the claw teeth 13, which define a generally vertical axis of the pull-down mechanism, are of a cross-section which is smaller than the perforations of either the regular 8 or super 8 film format so that they will accommodate either format. The pull-down mechanism is mounted for reciprocal up-and-down movement by suitable drive means (not shown) within the projector. As seen in FIG. 2, the optical axis 15 of the projector passes through slot 12 and also through an opening 16 in pull-down mechanism 14 so that a beam of light from the projection lamp (not shown) within housing 17 of FIG. 1 may pass therethrough. The difference in vertical location from perforation to the next in each format is compensated for by using a single comprise claw stroke that will work with either format. The difference between ten perforations of regular 8 film is the same as the distance between 9 perforations of super 8, film, i.e., 1.500 inches. Thus, this spacing is used between claws 13 so that they can accept either format. Since there is a common claw stroke and since pull-down mechanism 14 is not shifted vertically when the format is changed, it is desirable to select an appropriate distance above and below optical axis 15 for claws 13 to engage the film so that the horizontal center line of both the super 8 and regular 8 projected image will nearly coincide with the horizontal centerline of the optical system.

A framing plate F is adjustably attached to the opposite side of support 11 by means of a screw 18 extending through vertical slot 19, adjacent the left-hand edge of the framing plate, into a threaded hole 20 in support 11. Slot 19 permits vertical adjustment of the framing plate for framing the pictures by means of adjustment knob 21 of FIGS. 3 and 4 extending between flange 22 of support 11 and flange 23 of framing plate F. Framing plate F is also provided with a pair of spaced slots 24, aligned with vertical slot 12 of support 11 to accommodate claw 13 of pull-down mechanism 14. Between slots 24 is an aperture 25 which is aligned with optical axis 15 and opening 16 in the pull-down mechanism. The right-hand edge of the framing plate conveniently may be held by a pair of spaced leaf springs 26 attached to support 11, shown in FIGS. 3 and 4. The springs serve to hold the framing plate against support 11, shown in FIGS. 3 and 4. The springs serve to hold the framing plate against support 11 but permit vertical movement upon actuation of framing knob 21.

Film gate G is attached to the opposite side of framing plate F by means of spaced screws 27 extending through diagonal slots 28 therein and into threaded holes 29 of the framing plate F. An arm 30 extends laterally from the film gate G and is provided with a switch 31 at an end thereof for moving the film gate up and down. This up-and-down movement causes the film gate to be cammed by slots 28 riding along pins 27 so that the film gate is shifted in a lateral direction to accommodate either the regular 8 film format or super 8 film format, as described more fully below. The term "film gate," as used herein, includes the fixed and movable side guides, rails, an aperture mask and a pressure plate, all of which are assembled as one unit and are shifted together to change from one film format to another.

The film gate is also provided with a pair of vertically spaced apertures 32 and 33 which correspond in size to the frame of regular 8 film and super 8 film, respectively. These apertures are spaced so that when switch 31 moves film gate G to its uppermost position regular 8 aperture 32 is aligned with aperture 25 in framing plate F and when lever 31 moves the film gate to its lowermost position the super 8 aperture 33 is aligned with aperture 25. The up-and-down movement of film gate G is limited by the edges of opening 34 therein which engage pin 35 extending from framing plate F, as shown in FIGS. 3 and 4. The film gate G is held in its raised or lowered position by means of a leaf spring latch 36 which is attached to framing plate F by means of a pair of spaced pins 37. Conveniently, leaf spring latch 36 is provided with a curved upper end 38 forming a detent which engages an upper horizontal slot 39 when the film gate is in the lower position of FIG. 3 and engages a lower horizontal slot 40 when the film gate G is in the raised position of FIG. 4.

A resiliently mounted movable guide plate 42 has a laterally extending central notch 43 which is received over a pin 44 extending through opening 45 on film gate G. Side guides 46 at the opposite ends of plate 42 are normally urged through opening 47 in film gate G to hold the film against fixed side guides 48 of film gate G by a spring 49 which engages spaced lugs 50 of guide plate 42.

The operation of the gate system can now be understood best by looking at FIGS. 3 and 4. In FIG. 3, film gate has been pushed downwardly by switch 31 so that it is in its lowermost position with pin 35 engaging the upper left-hand corner of opening 34. In this position, larger aperture 33 which corresponds to the format of super 8 film 52 is aligned with aperture 25 of framing plate F. This movement causes claw 13 of the pull-down mechanism 14 to be positioned at the left-hand edge of slots 51, i.e., toward the edge of film gate G for engagement with the perforations of super 8 film 52. While in this lowermost position, the film guide arm 30 is held in this position by end 38 of spring 36 which engages horizontal slot 39.

To change to the regular 8 format position, it is merely necessary to push upwardly on switch 31 so that arm 30 raises film gate G to the position shown in FIG. 4. This movement causes the film gate to be moved or shifted to the left by the camming action of screws 27 in slots 28 with respect to the axis of claws 13 which are now in the lower right-hand portion of openings 51, i.e., toward the center of film gate G to line claw 13 with the perforations in regular 8 film 53. The vertical movement of film gate G will also cause aperture 32, which corresponds in format to the regular 8 film 53, to be shifted into alignment with aperture 25 of the framing plate F. In this position, it will be noted that pin 35 is positioned in the lower right-hand corner of opening 34.

From the foregoing, it can be seen that the novel features of this invention have been fulfilled to a marked degree. A single operating arm 30 may be moved to cause both a lateral and a vertical shift in film gate G so that the aperture openings therein are properly positioned and the claw mechanism is laterally aligned to engage the film format which is to be projected. Since the entire film guide is shifted rather than the film being slid across portions thereof, there is little possibility that the film will be damaged.

The invention has been described in detail with particular reference to the preferred embodiment thereof, but it will be understood that variations and modifications can be effected within the spirit and scope of the invention.

We claim:

1. In a motion-picture projector adapted to selectively project an image, through means defining a projection aperture, of one of a plurality of films of the same width but having different formats, wherein the frame size and the location of the perforations with respect to an edge of the film each differ from one format to the other format, a gate system comprising:

a shaftable gate for guiding film past said projection aperture defining means and having means defining a pluarlity of openings spaced longitudinally therealong, each opening defining means corresponding in size respectively to the frame size of one of said formats;

means engageable with film for advancing said film past said projection aperture defining means, said advancing means having a longitudinal axis;

means for shifting said film gate laterally and longitudinally with respect to the axis of said film advancing means to selective positions to align the one of said films which is in said projector for engagement by said film advancing means with the perforations of the film and to align one of said opening difining means corresponding to the frame size of the film with said projection aperture defining means; and means defining a plurality of slots in said shifting means, spaced longitudinally with respect to said film gate; and a leaf spring latch having a first end attached to said gate system and having a second end formed as a detent releasably engageable with each of said slot defining means respectively to hold said film gate when the latter is in one of said selective positions.

2. In a motion-picture projector, as claimed in claim 1, wherein said film advance means includes:
    claws having a smaller cross section than the perforations of said film formats and utilizing a single claw stroke for all formats.

3. In a motion-picture projector adapted to selectively project an image of one of a plurality of films of the same width but having different formats, wherein the frame size and the location of the perforations with respect to an edge of the film each differ from one format to the other format, a gate system comprising:
    a framing plate having means defining a projection opening therein and also having a first and second pin extending therefrom;
    a shiftable gate for guiding film past said projection aperture defining means and having a pair of opening defining means spaced longitudinally therealong, each opening defining means corresponding in size to said frame size of said formats and being alignable with said projection aperture defining means, having a third opening defining means with a periphery engageable by said first pin, and having a diagonal slot defining means engageable by said second pin;
    means engageable with film for advancing said film past said projection aperture defining means, said advancing means having a longitudinal axis; and
    an arm attachaed to and extending from said film gate for shifting said film gate longitudinally to selective positions with respect to the axis of said film advancing means to align one of said opening defining means with said projection aperture defining means, the engagement of said diagonal slot defining means and said second pin causing a simultaneous lateral movement of said film gate with respect to the axis of said film advancing means to align the perforations of the one of said films in said projector for engagement by said film advancing means, and said first pin engaging said periphery of said third opening defining means to limit both said lateral and said longitudinal movements of said film gate, said arm having a pair of slot defining means spaced apart a distance corresponding to the longitudinal movement of said film gate; and
    a leaf spring latch having a first end attached to said gate system and having a second end formed as a detent engageable with each of said slot defining means respectively to releasably hold said film gate when the latter is in one of said selective positions.

References Cited
UNITED STATES PATENTS

| 3,427,101 | 2/1969 | Jorgensen et al. | 352—79 |
| 3,449,044 | 6/1969 | Caprio | 352—79 |

NORTON ANSHER, Primary Examiner

M. H. HAYES, Assistant Examiner